Figure 1:
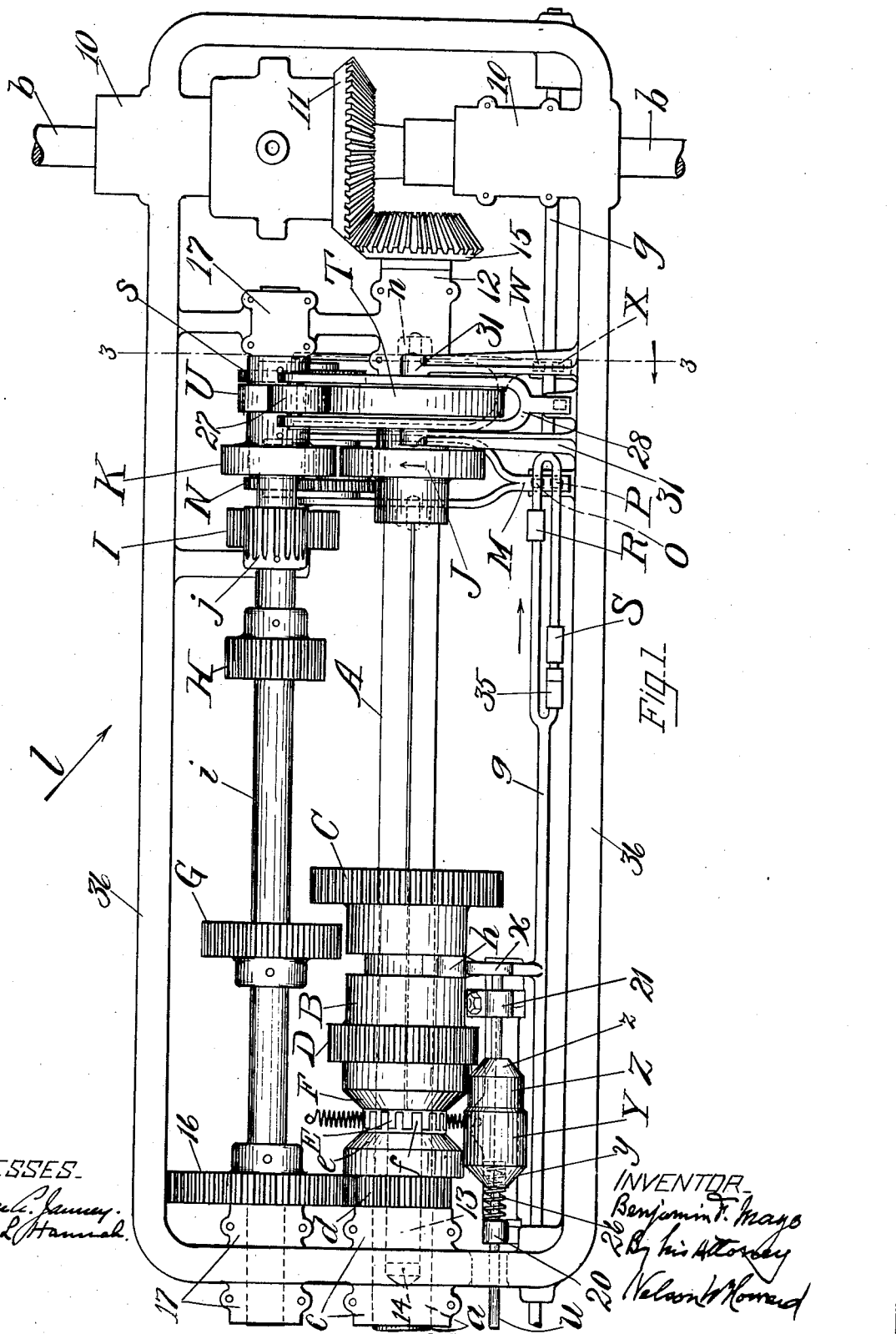

B. F. MAYO.
POWER TRANSMISSION MECHANISM.
APPLICATION FILED DEC. 9, 1905.

936,338.

Patented Oct. 12, 1909.
4 SHEETS—SHEET 3.

WITNESSES.
Laurence C. Janney.
Bertha L. Hannah.

INVENTOR.
Benjamin F. Mayo
By his Attorney,
Nelson W. Howard

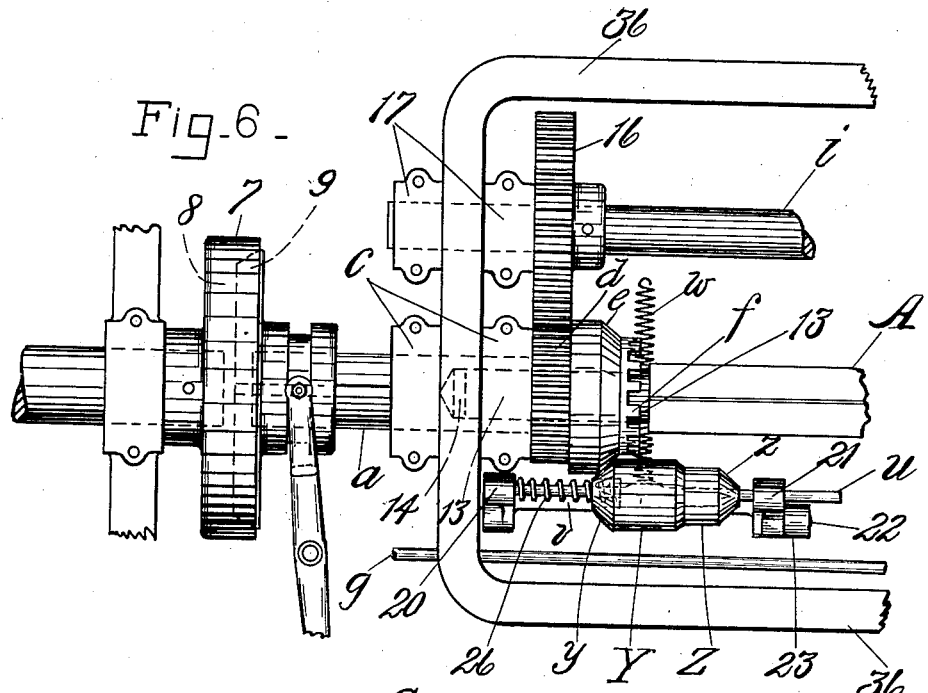
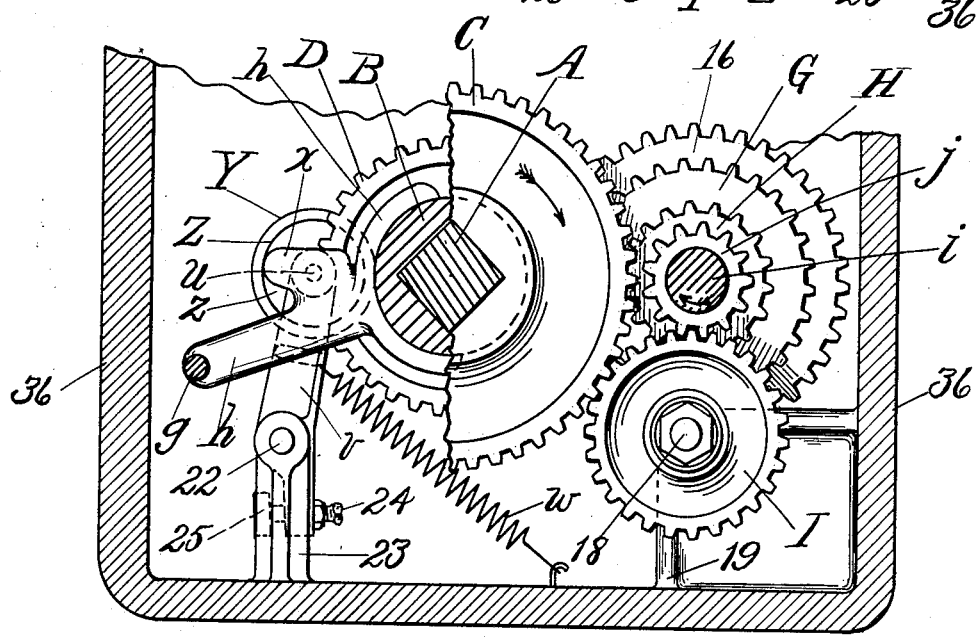

| # UNITED STATES PATENT OFFICE.

BENJAMIN F. MAYO, OF SALEM, MASSACHUSETTS.

POWER-TRANSMISSION MECHANISM.

936,338.  Specification of Letters Patent.  Patented Oct. 12, 1909.

Application filed December 9, 1905. Serial No. 291,140.

*To all whom it may concern:*

Be it known that I, BENJAMIN F. MAYO, a citizen of the United States, residing at Salem, in the county of Essex and Commonwealth of Massachusetts, have invented certain Improvements in Power-Transmission Mechanisms, of which the following description, in connection with the accompanying drawings, is a specification, like reference characters on the drawings indicating like parts in the several figures.

This invention relates to power-transmission mechanisms and, in its preferred application, pertains more particularly to variable speed mechanisms wherein a shaft or the like is arranged to be driven at different speeds and provision is made for changing from one speed to another.

The expression "speed relation" will be used frequently in the following discussion. It will be employed to designate the relative speed of driving and driven elements of a mechanism.

This invention is particularly concerned with improvements in power-transmission mechanisms pertaining to the establishment of predetermined speed relations between driving and driven elements, and pertaining to changes from one speed relation to another.

While this invention is particularly applicable to variable speed mechanisms, it may be practiced to advantage in connection with many mechanisms wherein a driving element and a driven element are desired to be connected for driving the latter in a speed relation different from that previously existing. Such a situation might occur, for example, when either element is operating and the other element is at rest, it being desired to connect the two for driving the driven element. Obviously the speed relation of the two elements, when one is being driven by the other, will be different from that existing when one is at rest and the other moving. If driving communication be established suddenly between the driving and driven elements, when one is operating and the other is at rest, the ensuing change of speed relation will be very abrupt, resulting in a shock to the mechanism which is likely to be injurious. To avoid this shock, this invention contemplates an arrangement whereby the driving and driven elements may be caused to assume approximately their new speed relation before driving communication is established between them.

To this end an important feature of the invention consists in a power-transmission mechanism having a driving element; a driven element; means for connecting said elements for driving the latter; and means for causing said elements to assume, prior to said connection, a speed relation approximating that intended to exist after said connection has been made.

A common type of variable speed mechanism used prior to this invention comprises a driven member arranged to be driven at a plurality of different speeds, actuating means for driving the driven member at the different speeds, and mechanism for changing the speed of the driven member from one speed to another. The actuating means is suitably associated with a source of power. In one form of this type of mechanism it is customary, just prior to a speed change, to cut off the power, thereby permitting the mechanism to run under its own momentum only. After the power has been thus cut off the speed changing mechanism acts, first to interrupt that communication between the actuating means and the driven member which drives the latter at one speed; and secondly to reëstablish communication between the actuating means and the driven member for driving the latter at a second speed. Thereafter the actuating means is again connected with the source of power to re-commence the drive of the mechanism. The actuating means and the driven member, when running at the first speed, have a certain definite speed relation which continues substantially the same during the brief interval of time consumed in making a speed change. Consequently, if communication is suddenly reëstablished for driving at a second speed, the speed relation of actuating means and shaft undergoes an abrupt change which, by reason of high momentum, may result in a serious shock to various parts of the mechanism. Such a shock is likely to impair and finally to destroy that smoothness and accuracy of operation which is desirable. In other instances the actuating means is continually connected with the source of power and in such case the former has a normally fixed speed. When communication between the actuating means and the driven member is interrupted, under these circumstances, the actuating means continues at its normal speed and the driven member rotates under its momentum, the two having a speed relation which continues substantially uniform until changed by some external influence. Consequently, when communication is reëstablished for driving at a second speed the driven member is forced to adapt itself to a new speed relation, and if this is effected suddenly an injurious shock results.

The difficulties attending changes of speed relation of driving and driven elements may be well exemplified by reference to a sliding-gear transmission mechanism of a type heretofore used. In general terms this type of mechanism comprises a driven shaft, a driving shaft, a rigid gear on one of said shafts and a sliding gear on the other shaft. If, when the two shafts are moving in one speed relation, it be desired to change the speed relation to that determined by the intermeshing of the two gears, the sliding gear is moved up against the rigid gear. The two gears are then moving at different peripheral speeds and some time will elapse before their speeds are sufficiently harmonized to permit them to mesh. Moreover, when the gears are thrown together and attempt to mesh, if their momenta be at all considerable, they are subjected to a sudden shock which is likely to strip the gears of their teeth and otherwise injure the mechanism. Evidently these difficulties preclude prompt change of speed relation which is desirable, especially in connection with variable speed mechanisms, and also involve very destructive wear.

The great disadvantage of making an abrupt change from one speed to another in variable speed mechanisms has been well recognized in the art, and attempts have been made to obviate the necessity for abruptly changing the speed relation of the actuating means and driven member in order to change the absolute speed of the latter. For example, it has been proposed to reduce the speed of the actuating means and driven member just prior to a speed change, thereby permitting changes in speed relation to be made under conditions of low absolute speed when there is not sufficient momentum to do any material damage. The practice of this suggestion has, however, necessitated a temporary reduction in the speed of the driven member regardless of the probable inconvenience of such reduction. Obviously this would be highly unsuitable for many uses of a variable speed mechanism.

An object of this invention is to facilitate changes from one speed relation to another, so that the changes may be made promptly and without necessitating reduction in absolute speed except where desired.

It is a further object of the invention substantially to eliminate the shock which usually attended changes in speed relation in mechanisms heretofore used.

The attainment of these objects in mechanisms employing gears, for example, permits the gears to be readily meshed and obviates gear stripping and other disastrous results of shock to the mechanism. These ends are effected, as regards variable speed mechanisms, by causing the actuating means and driven member, during a speed change, to assume more or less gradually a speed relation appropriate to the new speed before communication is established between the actuating means and driven member for driving the latter at the new speed. This effects an easy transition from the first speed to the second so that, when driving communication is finally established, only an immaterial relative change, if any, will be necessary to bring the parts into proper final accord.

To this end an important feature of the invention comprises a variable speed mechanism having a driven member arranged to be driven at a plurality of different speeds; actuating means for driving the driven member at the different speeds; mechanism for changing the speed of the driven member from one speed to a second speed; and means for causing the driven member and actuating means to assume approximately the speed relation appropriate to the second speed before the actuating means becomes effective to drive the driven member at said second speed.

The above described feature of the invention is equally important whether the actuating means is arranged to be disconnected from the source of power, or the actuating means is constantly connected with the source of power. In the latter case the application of this invention may result in causing the driven member to assume approximately the second speed after the first speed has been interrupted and before the second speed has been finally established, thereby more or less gradually effecting the transition from the first speed to the second and attaining the new speed relation without materially affecting the absolute speed of the actuating means.

In this connection a more specific feature of the invention comprises a variable speed mechanism having a driven member arranged to be driven at a plurality of different speeds; actuating means for driving the driven member at the different speeds; mechanism for changing the speed of the driven member from one speed to a second speed; and means for causing the driven member to assume approximately said second speed before the actuating means becomes effective to drive the driven member at said second speed.

The invention also contemplates an arrangement whereby the rotation of the driven member may be readily reversed without material shock and in this connection the invention comprises a reversing mechanism having a driven member; actuating means for driving the driven member in one direction; reversing actuating means for driving the driven member in a reverse direction; mechanism for changing the direction of movement of the driven member from one direction to the reverse; and means for causing said reversing actuating means and driven member to assume approximately the relation appropriate to reverse movement of the driven member before said reversing actuating means becomes effective to drive the driven member in said reverse direction.

Other features of the invention will be explained in the following description and will be defined in the claims.

The expressions "change of speed," "speed change" and the like used herein, are to be construed, where the context permits, as including changes both from one speed to a higher speed and from one speed to a lower speed.

The invention will be described herein, for purposes of illustration, as embodied in a variable speed mechanism of the "sliding gear" type. Nothing herein contained is to be construed, however, as limiting this invention in its application to use in connection with the specific mechanism shown in the drawings, or in connection with mechanisms of the same type. All discussion of possible modifications will be postponed until the particular devices shown in the drawings have been fully described.

Figure 2:
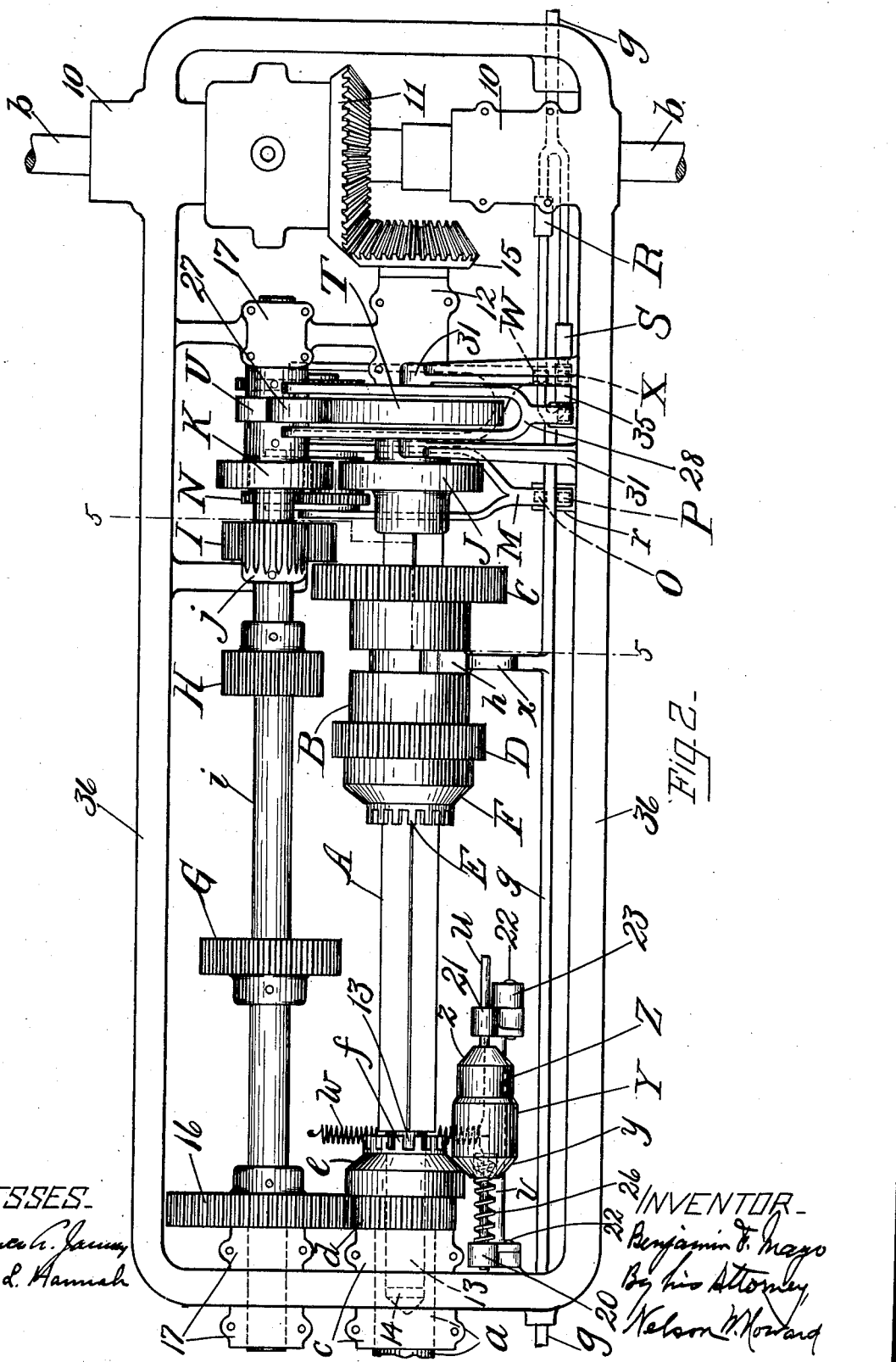
Figure 3:
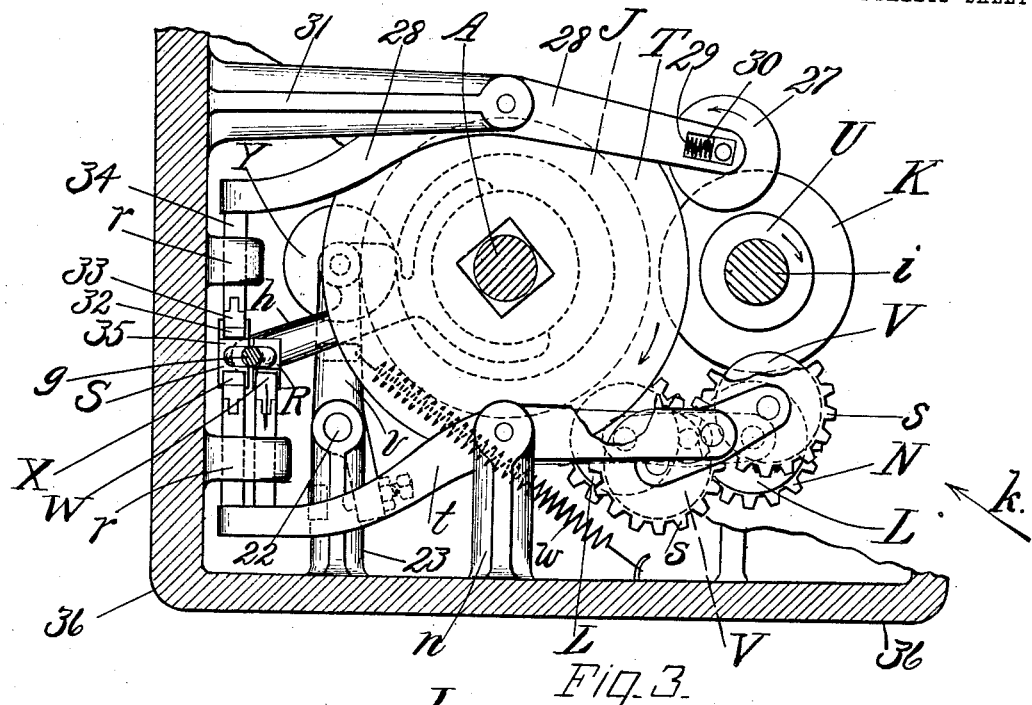
Figure 4:
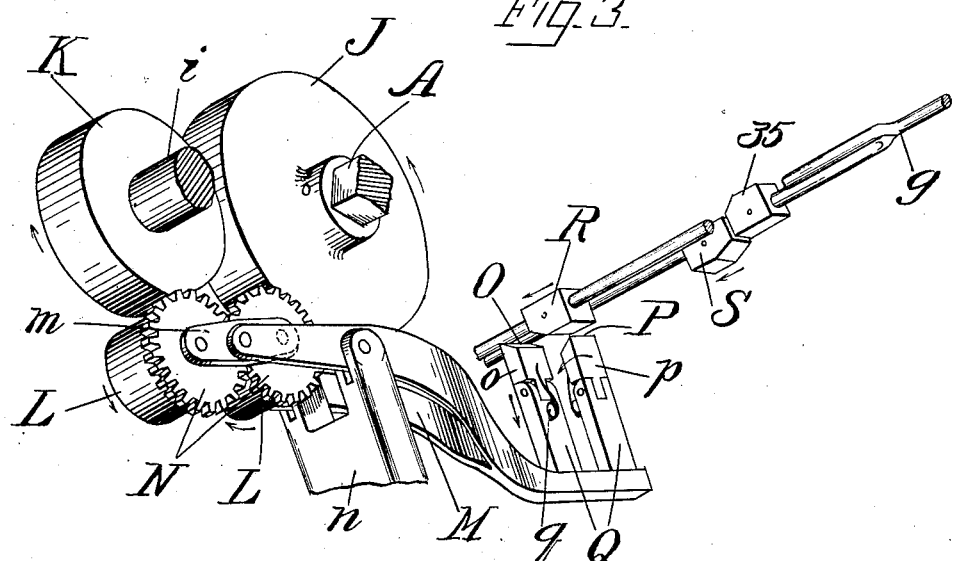

In the drawings, Figure 1 is a plan view of a variable speed mechanism showing it in condition for a direct drive at high speed; Fig. 2 is a plan view of a variable speed mechanism showing the parts in their positions just prior to the establishment of communication between the shaft and reversing actuating means for reversing the direction of rotation of the shaft; Fig. 3 is a transverse vertical section on the line 3—3 of Fig. 1; Fig. 4 is a detail perspective of a portion of the mechanism embodying this invention; Fig. 5 is a transverse vertical section on the line 5—5 of Fig 2; Fig. 6 is a plan view of a portion of the mechanism shown in Fig. 2, illustrating a convenient manner of applying power to the actuating means.

The specific embodiment of this invention shown in the drawings comprises a power shaft $a$, an objective shaft $b$ and a variable speed mechanism, intermediate the power shaft $a$ and the objective shaft $b$, which is arranged for transmitting power from the former to the latter so that the latter shall be ultimately driven at different speeds according to the will of the operator.

The power shaft $a$ may be driven in any convenient manner. For example it may be connected with an engine through a clutch 7 (see Fig. 6) whereby the communication of power to the shaft $a$ may be interrupted if desired. The clutch 7 is shown as an ordinary friction clutch having a concave frusto-conical friction surface 8 carried rigidly on an engine shaft, and a convex frusto-conical friction surface 9 on a carrier which is keyed on shaft $a$ so as to be slidable thereon but non-rotatable relatively thereto. The carrier for the friction surface 9 is supplied with a clutch throwing lever whereby the clutch may be engaged and disengaged (see Fig. 6). The shaft $a$ is journaled in bearings $c$, and has a rigid gear $d$, a rigid collar having a frusto-conical friction surface $e$, and a dentil clutch member $f$.

The objective shaft $b$ is shown for the purpose of illustrating the way in which a machine, vehicle or the like might be coupled with the variable speed mechanism. The shaft $b$ is journaled in bearings 10, 10 and has preferably a bevel gear 11.

The variable speed mechanism includes a driven shaft A; a sliding gear block B and actuating means for driving said shaft A through the agency of the sliding gear block B. The shaft A is the driven member of this specific variable speed mechanism. It is journaled at one end in bearings 12, and at its other end it has a cylindrical reduced portion 13 which is journaled in a seat 14 consisting of a hole drilled axially in the end of the power shaft $a$. A bevel gear 15, on one end of the shaft A, meshes with the bevel gear 11 on the objective shaft $b$. The shaft A is arranged to be driven at a plurality of different speeds by the actuating means, and the action of the latter is communicated to the objective shaft $b$ through the bevel gears 15 and 11.

The speed changing mechanism, for changing the speed of the shaft A from one speed to another, comprises the sliding gear block B and a controller rod $g$. The sliding gear block B is arranged to be freely movable axially on said shaft and to be non-rotatable relatively thereto. The block B carries a low speed driven gear C, an intermediate speed driven gear D and a dentil clutch member E, which latter is adapted to engage with the dentil clutch member $f$ under appropriate circumstances. The block B is moved axially on the shaft A by means of the controller rod $g$ which may be actuated through a hand lever, or in any other practicable manner. The controller rod $g$ is associated with the block B through a yoke $h$, rigidly secured to said rod at substantially right angles, the arms of said yoke being arranged to engage an annular recess in the block B so that longitudinal movement of the rod $g$ shall cause corresponding longitudinal movement of the block B on the shaft A. The block B also carries a frusto-conical friction surface F which coöperates indirectly, under certain conditions, with the frusto-conical friction surface e.

The specific actuating means shown in the drawings, for driving the shaft A, consists of a system of driving elements including the dentil clutch member f, (which drives the shaft A at high speed), the intermediate speed drive gear G, and the low speed drive gear H. The dentil clutch member f on the power shaft a engages the dentil clutch member e on the shaft A when the sliding gear block is in the position shown in Fig. 1. In this case the power of the shaft a is transmitted by direct drive through the dentil clutch to the shaft A, thence through the bevel gear 15 to the bevel gear 11, thereby driving the objective shaft b. For convenience, the intermediate speed drive gear G and the low speed drive gear H may be carried on an auxiliary shaft i which receives motion from the gear d on the power shaft a, through a gear 16 carried at one end of the auxiliary shaft i. The shaft i is journaled in bearings 17, 17. The speed of the auxiliary shaft i is preferably somewhat reduced below that of the power shaft a by the arrangement of gears shown in the drawings in which the gear 16 on the former is of greater diameter than the gear d on the latter.

When it is desired that the shaft b be driven at intermediate speed the sliding gear block B is shifted axially on the shaft A until the gear D meshes with the gear G. It will be noted that, during the movement of the block B to this end, an interval of time will elapse after the dentil clutch has been disengaged and before the intermediate speed gears D and G have been meshed. When it is desired to drive the shaft b at low speed the block B is shifted until the gear C meshes with the gear H. An interval of time elapses, during the movement of the block B to low speed engagement, after the intermediate speed gears have been unmeshed and before the low speed gears have been meshed. If it were attempted (as has frequently been necessary in mechanisms heretofore used) to throw the speed from high to intermediate, or from intermediate to low, or vice versa, without providing any means for bringing the gears intended to be meshed to approximately the same peripheral speed, the crash of the gears moving at different speeds with high momentums, as they come together and attempt to mesh, would be very destructive and would be likely to strip the gears of their teeth. The interval of time which intervenes between the interruption of communication between the actuating means and the driven member (i. e. unmeshing one pair of coöperating gears), and the reëstablishment of communication between the actuating means and driven member (i. e. meshing a second pair of coöperating gears), is employed in the practice of the present invention, in giving to the actuating means and driven member, more or less gradually, approximately the speed relation which is intended to exist when the change of speed has been completed. As applied to the specific mechanism shown in the drawings, this results in giving to a pair of coöperating gears, which are about to be meshed, approximately the same peripheral speeds. The manner in which this is accomplished will hereinafter be explained.

It is usually desirable to provide for reversing the direction of rotation of an objective shaft and to this end the mechanism shown in the drawings comprises means for reversing the direction of rotation of the shaft A, whereby the shaft b is also reversed. The actuating means for the reverse movement of the shaft A consists of a gear I which for convenience may be driven by a pinion j carried on the auxiliary shaft i. The gear I may conveniently be supported upon a stud 18 carried by a bracket 19. The reverse is effected by moving the low speed gear C of the block B into mesh with the reversing gear I. The position of the parts when this reverse is about to take place is shown in Fig. 2 and the relations of the pinion j, the reversing gear I and the low speed gear C may be observed in end elevation in Fig. 5. With this arrangement the reversing gear I constitutes an intermediary gear between the pinion j and the low speed gear C; so that said low speed gear C is driven in the same direction as the pinion j, which is the opposite direction from that in which the gears on block B are driven when meshing directly with gears on the shaft i. An interval of time intervenes between the interruption of communication between the actuating means and shaft (i. e. unmeshing the low speed gears C and H) and the establishment of communication between the shaft and reversing actuating means for driving in reverse direction (i. e. meshing the low speed gear C and the reversing gear I) and this interval is employed in the practice of the present invention in causing the actuating means and shaft to assume more or less gradually, approximately the relation appropriate to the reverse movement of the shaft. This end is accomplished in a manner presently to be described.

Those instrumentalities which cause the shaft and actuating means to assume approximately the speed relation appropriate to a new speed before the actuating means becomes effective to drive the shaft at said new speed, shall be hereinafter designated, for the sake of brevity, the "auxiliary speed changing devices". In the specific embodiment of this invention shown in the drawings an auxiliary speed changing device is provided to correspond to each speed at which the mechanism may be operated. That is to say, an auxiliary speed changing device is provided to act when a change is being made from high or low to intermediate speed; another auxiliary speed changing device is supplied to act when a change is being made from intermediate or reverse to low speed; and a third is supplied to act when a change is being made from intermediate to high speed. The auxiliary speed changing devices are shown in plan in Figs. 1 and 2, in end elevation in Fig. 3 and one of said devices (the one for changing from high or low to intermediate) is shown in perspective in Fig. 4. Since Fig. 4 may be somewhat confusing it may be said that the view represented therein is seen by looking in the direction indicated approximately, in a vertical plane by an arrow $k$, Fig. 3, and in a horizontal plane by an arrow $l$, Fig. 1, it being assumed that certain parts of the mechanism are removed to permit an unobstructed view.

The auxiliary speed changing device which operates during a change from high or low speed to intermediate, will be first described. It may be best observed in Fig. 4. The principal elements of this device comprise a pulley J rigid on the shaft A, and a pulley K rigid on the auxiliary shaft $i$. These pulleys are in alinement transversely of their respective shafts and are arranged to be out of contact with each other. A pair of supplementary pulleys L, L are carried, in transverse alinement with each other and with the pulleys J and K, on studs supported in a frame $m$. The frame $m$ is pivoted, midway between said studs, to a rocking carriage M. The pivot of the frame $m$ is substantially parallel to the shafts A and $i$. The rocking carriage M consists of a bifurcated lever the arms of which embrace the frame $m$. The carriage M is pivoted to a bracket $n$ and this pivot is also parallel to the shafts A and $i$ and the pivot of the frame $m$. Each supplementary pulley L, L has a rigid gear N; and the gears N, N intermesh. The periphery of each of the pulleys J, K and L, L constitutes a friction surface. If the shaft A and the shaft $i$ be rotating, and communication between them be interrupted; and if thereupon the carriage M be rocked in the appropriate direction, the supplementary pulleys L, L will contact respectively with the pulleys J and K and will thereby serve to communicate the motion of one to the other. In this manner the speed relation between the actuating means (specifically, the driving system controlled by the shaft $i$) and the shaft A may be compelled to assume a speed relation which is determined by the diameters of the pulleys K and L. The diameters of these pulleys are such that the speed relation determined thereby, when the supplementary pulleys L, L are active, is approximately appropriate to the intermediate speed of the variable speed mechanism. That is to say, if the supplementary pulleys be put into operation prior to the engagement of the intermediate speed gears D and G, in changing either from high or low, the shaft A and the system of driving elements of which the gear G forms a part (i. e. the actuating means) will be caused to assume approximately their proper speed relation before said gears D and G are meshed. The supplementary pulleys L, L are thrown into operation by rocking the carriage M, and said carriage is rocked alternatively through cam faces O and P (see Fig. 4). These cam faces are formed by beveling the upper faces of blocks $o$, $p$. Each block $o$, $p$ is pivoted to a standard Q, said pivots being at substantially right angles to the pivots of the supplementary pulleys L, L. The cam faces O and P are oppositely disposed and each is arranged to be rotatable on its pivot out of and into alinement with its standard Q, on one side of said standard only. For example, the block $p$ is capable of being rocked in the direction of the arrow shown thereon (see Fig. 4) and of returning to its upright position; but said block is prevented from moving in the opposite direction to said arrow by the tongue and groove construction shown in the drawings, or in any other suitable manner. The block $c$ is similarly arranged so as to be rotatable only in the opposite direction to the arrow on block $p$. Each block $o$, $p$ is held normally upright in alinement with its standard Q by means of a spring $q$.

By reference to Fig. 1 it will be seen that the controller rod $g$, throughout a portion of its length, is bifurcated. On one of its bifurcations said rod carries a cam block R (also shown in Fig. 4). This cam block R is so situated that, when the controller rod $g$ is moved in the direction of the arrow shown in Fig. 1 said block will strike the cam face O, thereby depressing the outer end of the carriage M and causing the supplementary pulleys L, L to contact respectively with the pulleys J, K. The cam block R is so situated on the controller rod $g$ that said cam block becomes effective to throw the supplementary pulleys into action a short time before the intermediate speed driven gear D (also moved through the agency of the rod $g$) comes in contact with the intermediate speed drive gear C during a change from high to intermediate speed. In this manner, by the time the gear D reaches the gear G, the two have assumed approximately the proper speed relation and they are thereupon intermeshed with no material shock. The standards Q, Q may be provided with vertical guideways in brackets r. On the opposite bifurcation of the controller rod g from the one carrying the cam block R is a cam block S (see Figs. 1 and 4). As the rod g progresses in the direction indicated by the arrows in Fig. 4 the block R strikes the cam face O and depresses one end of the carriage M as above described. As said rod g progresses farther the rear face of the block S contacts with the rear face of the block p causing the latter to rock upon its pivot against the tension of its spring q. Thus when the rod g is moving in the direction of said arrow the cam block S is inoperative as to any effect upon the supplementary pulleys L, L. On the return movement of the rod g, however, the block R becomes inoperative while the block S is effective to act upon the cam face P to depress one end of the carriage M and thereby throw the supplementary pulleys L, L into action. As already explained, this action of the supplementary pulleys causes the shaft and actuating means to assume a speed relation appropriate to intermediate speed. The cam block S is so situated upon the rod g that it acts to throw the supplementary pulleys L, L into operation a short time before the intermediate speed driven gear D comes in contact with the intermediate speed drive gear G during a change from low to intermediate speed. In this manner, by the time the gear D reaches the gear G, when moving from low to intermediate, said two gears have assumed approximately their proper speed relation and they are thereupon intermeshed with no material shock.

The auxiliary speed changing device corresponding to the low speed of the variable speed mechanism is similar in its construction and mode of operation to that just described, corresponding to the intermediate speed. Said device comprises a pulley T rigid on the shaft A, a pulley U rigid on the auxiliary shaft i and a pair of supplementary pulleys V, V with intermeshing gears s, s. The diameters of the pulleys T and U are such that the speed relation determined thereby, when the supplementary pulleys V, V are active, is approximately appropriate to the low speed of the variable speed mechanism. That is to say, if said supplementary pulleys be put into operation prior to the engagement of the low speed gears C and H, in changing either from intermediate or reverse to low speed, the shaft A, and the system of driving elements of which the gear H forms a part (i. e. the actuating means) will be caused to assume their proper speed relation before said gears C and H are meshed. The supplementary pulleys V, V are carried on a frame pivoted to a carriage t which is similar to the carriage M. Said carriage is pivoted to a bracket n and is rocked, to throw the supplementary pulleys V, V into and out of operation, through the agency of cam faces W and X provided on blocks pivotally supported upon standards secured at one end of the carriage t, said blocks and standard being substantially like those described in connection with the cam faces O and P. The cam faces W and X are acted upon by the cam blocks R and S to similar ends and in the same manner as are the cams O and P.

The preceding discussion has been devoted to the auxiliary speed changing devices corresponding to the intermediate speed and the low speed of the variable speed mechanism. An auxiliary speed changing device of a somewhat different type is employed to correspond to the high speed of the variable speed mechanism. The latter comprises a drum Y rigidly secured to a shaft u which is slidable axially in its bearings 20 and 21 (see Fig. 1). The shaft u is substantially parallel to the shaft A and the bearings 20 and 21 are supplied in the arms of a yoke v. This yoke v is pivoted at 22 in a bracket 23 and is provided with an adjustable stop screw 24 which abuts against a rigid stop 25, carried by the bracket 23, for limiting the rocking movement of said yoke. A spring w, attached at one end to the yoke v, tends constantly to rock said yoke v toward its stopped position (see Fig. 5). Surrounding the shaft u between the bearing 20 and a socket in the drum Y, is a spiral spring 26 which tends constantly to slide the shaft u toward the right as viewed in Figs. 1 and 2. The action of said spring is opposed, under appropriate circumstances, by a finger x on the yoke h which abuts against the end of the shaft u to hold the latter in the position shown in Fig. 1. The drum Y has a frusto-conical friction surface y and a frusto-conical friction-surface z which are arranged to coöperate respectively, under proper conditions, with the friction surfaces e and F.

The last-described auxiliary speed changing device is operative only during a change of speed from intermediate to high, i. e. when the block B is being moved to unmesh the intermediate speed gears D and G and to engage the dentil clutch members f and E. When the controller rod g is moved in the direction of the arrow shown adjacent thereto in Fig. 1, thereby shifting the block B, the drum Y is permitted to assume the position shown in Fig. 2. The finger x having been removed from contact with the end of the shaft u, the spring 26 is effective to slide the drum Y and the shaft u axially toward the right (see Fig. 2) whereupon the spring w becomes effective to rock the yoke v so that the friction surface y on the drum Y comes in contact with the friction surface e carried on the power shaft a. Thus whatever rotation said power shaft $a$ may have is communicated to the drum Y which continues to rotate while the said parts remain in the position shown in Fig. 2. If now the block B be returned toward the position shown in Fig. 1 its friction surface F will presently contact with the friction surface $z$ on the drum Y; and the block B, and therethrough the shaft A, will be caused to assume approximately the speed of the power shaft $a$. It is apparent that the speed relation appropriate to the direct drive through the dentil clutch, exists when the power shaft $a$ and the shaft A are rotating at the same rate of speed. It is evident then that the action of the drum Y causes the actuating means (specifically the driving system of which the power shaft $a$ is a part) and the shaft A, to assume approximately the speed relation appropriate to the high speed of the variable speed mechanism. It will be noted that the drum Y has a reduced portion Z so that the greatest diameter of the friction surface $z$ is less than the greatest diameter of the friction surface $y$. This difference in diameter is of importance for a reason about to be disclosed. Theoretically, it might be considered advantageous, during the speed change, to have the actuating means and shaft assume exactly the speed relation which they are intended to have as a result of the speed change; and if the proper meshing of the gears could be relied upon in every instance under these circumstances this theory might well be practiced; but if the auxiliary speed changing devices were constructed to cause, for example, the intermediate speed gears D and G to rotate at exactly the same peripheral speeds just prior to being meshed, it would very probably happen, from time to time, that the teeth of one of said gears would abut more or less squarely upon the teeth of the other gear, and it would be impossible to mesh the gears. If, however, the gear teeth of one abut against the gear teeth of the other while the gears are traveling at slightly different peripheral speeds the obstruction to proper meshing will be merely temporary. It is considered, therefore, preferable to have each auxiliary speed changing device arranged so as to cause the actuating means and shaft to assume only approximately the speed relation appropriate to the speed intended to result from any given change. The diameters of the pulleys J, K, T, and U are suitably proportioned with this in view; and to the same end the drum Y is provided with the reduced portion Z. The greatest peripheral speed of the friction surface $z$ is slightly less than the greatest peripheral speed of the friction surface $y$ and consequently the speed communicated to the block B by the friction surface $z$ will be slightly less than the speed at which the power shaft $a$ is running. Hence, when the members of the dentil clutch are brought near enough to mesh they will meet with only temporary, if any, obstruction. As the controller rod $g$ is moved to make the speed change from intermediate to high the finger $x$ will abut against the end of the shaft $u$ at the proper time to cause the friction surface $y$ to slide toward the left (as seen in Fig. 2) over the friction surface $e$, thereby opposing the spring 26 and causing the yoke $v$ to rock against the tension of the spring $w$. In this manner the drum Y is rendered inoperative when it has fulfilled its function of bringing the power shaft $a$ and the shaft A into approximately their proper speed relation.

As before stated, this invention comprises a device for causing the reversing actuating means and shaft to assume a relation appropriate to a reverse movement of the shaft before said reversing actuating means becomes effective to drive the shaft in reverse direction. In the mechanism shown in the present drawings, the speed of the shaft A after it has been reversed is substantially the same as the low speed and consequently the auxiliary speed changing pulleys T and U are employed as elements of the auxiliary reversing device. The relation of these parts may well be observed in end elevation in Fig. 3 and in plan in Figs. 1 and 2. A pulley 27 is supported on a stud or a shaft journaled in bearings mounted in the arms of a carriage 28. Said bearings are preferably slidable in slots 29 in said arms, and are maintained normally in position at one end of said slot by springs 30. The carriage 28 is pivoted to a bracket 31 and said carriage is movable about its pivot to cause the pulley 27 to contact simultaneously with the pulley T and the pulley U. The carriage is thus moved about its pivot through the agency of a cam face 32 similar to the cam face $o$, and similarly supported upon a pivoted cam block 33 and standard 34 carried upon one end of the carriage 28. This cam face 32 is acted upon by a cam block 35 secured on one of the bifurcations of the controller rod $g$ (see Fig. 4). The cam block 35 is so situated upon the rod $g$ that the pulley 27 is thrown into contact with the pulleys T and U simultaneously, a short time before the low speed driven gear C engages with the reversing gear I. When the pulley 27 contacts with the pulleys T and U it causes the direction of motion of one or the other of them to be reversed and thus they are caused to assume the relation appropriate to the reverse, before the gears C and I mesh; and by reason of the speed relation determined by the pulleys T and U the reverse movement will have approximately the speed relation intended to exist after the reverse has been effected.

The above described mechanism may be conveniently incased in a housing 36 which may serve both as a protecting covering and as a frame for supporting the various bearings and brackets of the mechanism. If desired the housing 36 may be supplied with a top cover to complete the inclosure of the mechanism.

By way of further elucidation the operation of the variable speed mechanism shown in the drawings will be described in changing the speed of the objective shaft from high speed to intermediate, to low speed and to reverse and back to low speed, intermediate speed and finally to high speed again. Starting with the position shown in Fig. 1, the objective shaft $b$ is being driven at high speed by direct drive through the dentil clutch from the power shaft $a$. As has already been stated, it is sometimes preferred to cut off power just prior to a speed change and the operation of the present specific mechanism will be described as complying with this preference. If then it be desired to change from high speed to intermediate, the power is cut off from the power shaft $a$ by throwing the clutch 7 out of engagement. Thereupon the machine or the like driven by the objective shaft $b$, together with the variable speed mechanism, operate only under their own momentum. The controller rod $g$ is moved in the direction of the arrow indicated adjacent thereto in Fig. 1 to shift the sliding gear block B to disengage the dentil clutch and thereby to interrupt communication between the actuating means and the shaft A. Hereupon the system of driving elements constituting the actuating means runs idly under its own momentum independently of the driven elements, and the shaft A and associated parts run under their own momentum and that of the machine coupled to the objective shaft $b$. Under these circumstances it is likely that the driven elements will have a considerably greater momentum than the driving elements. As the movement of the controller rod $g$ progresses, moving the intermediate speed driven gear D toward the intermediate speed drive gear G, the cam block R will presently contact with the cam O to rock the supplementary pulleys L, L and throw into operation the auxiliary speed changing device corresponding to the intermediate speed. The effect of this will probably be to cause the driving system, by reason of its lower momentum, to make the greater change which contributes to bring the shaft and actuating means into the speed relation appropriate to the intermediate speed. At any rate when the gear D is about to mesh with the gear G the actuating means and the shaft will have been caused to assume approximately their desired speed relation and the two gears are then intermeshed, by further movement of the rod $g$, without injurious shock.

The operation just described, especially in that it includes the preliminary cut-off of power, is thought preferable when the objective shaft $b$ is coupled with a machine which runs at high momentum; because if the driving system is rendered temporarily idle it offers comparatively slight resistance to a change of absolute speed, contributory to the assumption of a new speed relation. It may be considered more desirable, however, in some cases to have the driving elements constantly connected with the power, and under these conditions the shaft A and the driven elements will probably be given the greater change in absolute speed necessary to the attainment of the new speed relation. While this latter operation might be less desirable in some instances, it would be practicable in connection with the running of a machine or the like which operates at comparatively low momentum; and it would also be practicable if a clutch were supplied intermediate the shaft A and the objective shaft $b$ to permit the shaft A to be isolated from the momentum of the driven machine or the like.

Just previously to the meshing of the intermediate speed gears, the block R departs from effective engagement with the cam O and thereby permits the supplementary pulleys L, L to withdraw and render the auxiliary speed changing device inoperative. Hence, it is evident that during the minute interval immediately prior to the meshing of the gears the actuating means and the driven elements are traveling free and no material resistance will be offered to the complete final engagement of the gears. When the gears have been meshed the clutch 7 may be engaged, whereupon power will be transmitted to drive the actuating means, and therethrough the shaft, in their newly assumed speed relation. While the sliding gear block B was being shifted to change from high to intermediate speed the drum Y was permitted to take the position shown in Fig. 2 and is therefore in position to act as auxiliary speed changing device whenever said block B shall be returned to engagement with it.

The significance of the interruption and reëstablishment of communication through the clutch 7 has been sufficiently discussed and in the following description it will be assumed, for convenience, that power is cut off prior to each speed change and cut in after each change has been made. As already explained this is preferred, but by no means essential. At this stage in the operation the intermediate speed gears are in engagement. If now the controller rod $g$ be moved again in the direction of the arrow shown in Fig. 1 the intermediate speed gears will be disengaged and the low speed gear C will be moved toward the low speed drive gear H. During this movement the block R approaches and finally strikes the cam face W thereby causing the supplementary pulleys V, V to throw the second auxiliary speed changing device into operation. By the time the gear C is ready to mesh with the gear H the actuating means and the shaft A have assumed approximately their appropriate speed relation; and just prior to the meshing of said gears the block R departs from its engagement with the cam face W, thereby rendering the second auxiliary speed changing device inoperative and permitting the gears to be meshed without external resistance. Moving the controller rod $g$ still farther, the gears C and H will be unmeshed and the former will be moved toward the reversing gear I. During this movement the reversing cam block 35 approaches and finally strikes the cam face 32 on the pivoted block 33, thereby causing the pulley 27 to engage, simultaneously, the pulleys T and U. This causes the actuating means and the shaft A to assume a new relation appropriate to reverse movement of the latter. Just before the gear C reaches the gear I the cam block 35 departs from its engagement with the cam 32 thereby permitting the pulley 27 to be withdrawn from operation by the counterbalancing weight of its carriage 28. Thereafter the gears C and I are meshed for driving the shaft A in reverse direction. In changing from the reverse to low speed forward motion of the shaft A the controller rod $g$ is moved in the opposite direction to the arrow shown in Fig. 1. The first effect is to unmesh the gears C and I. After this has been done and before the gear C meshes with the gear H the cam block S engages the cam X and thereby throws into operation the auxiliary speed changing device for the low speed which at the same time serves as an auxiliary reversing device for changing the motion of the shaft A from the reverse to forward. Thereafter the gears C and H are meshed for the low speed. Moving the controller rod $g$ farther the gears C and H are unmeshed and the gear D is moved toward the gear G. During this movement the block S engages the cam P thereby throwing into operation the auxiliary speed changing device for the intermediate speed. Thereafter the gears D and G are intermeshed for the intermediate speed. Further movement of the rod $g$ unmeshes the gears D and G and moves the dentil clutch member E toward the dentil clutch member $f$. During this movement the friction surface F contacts with the friction surface $z$ and receives therefrom motion transmitted through the friction surface $y$ from the power shaft $a$, with the result that the power shaft $a$ and the shaft A are caused to assume their appropriate speed relation. This having been effected the further progress of the rod $g$ causes the finger $x$ to move against the end of the shaft $u$ thereby causing said shaft $u$ and the drum Y to move axially against the spring 26. This axial movement of the drum Y causes the friction surface $y$ to slide upon the friction surface $e$ to remove the drum Y from operation, as already described. Further movement of the rod $g$ brings the dentil clutch members into engagement and at this point the various parts of the mechanism have resumed the positions shown in Fig. 1.

It will be noted that the actuating means shown as embodying this invention, act upon the driven member, through a positive drive, as for example, through the interengagement of gears. The auxiliary speed changing devices, on the other hand, act through a less positive engagement, as for example through friction, in order that the final effect of said devices may be attained more or less gradually without the shock involved in an abrupt change through the agency of a positive drive. It will also be noted that normally the various instrumentalities of the auxiliary speed changing devices are out of engagement with each other. While this is not absolutely essential it is somewhat to be preferred as a precaution against possible interference of said devices with the operation of the other elements of the mechanism.

In employing this invention in connection with many mechanisms of other types than that shown in the drawings, certain changes might be necessitated; but such changes would entail mere mechanical skill and would in no way avoid the proper scope of this invention as including such changes. By way of exemplifying the changes which might be made in the above-described variable speed mechanism it may be said, that the functions of the driving and driven systems might be exactly reversed so that the shaft A would become a driving member and the shaft $i$ a driven member. Also a clutch might be provided which would permit communication between the shaft A and the objective shaft B to be interrupted at will. The means for transmitting power from the power-shaft $a$ to the driven shaft A has been shown as a dentil clutch; but it is evident that this could be a clutch of any practicable type, or if desired it could be omitted altogether. The mechanism shown in the drawings is capable of driving at three speeds forward and one speed reverse: it is obvious that by a suitable reduplication of parts the number of speeds of both forward and reverse movement could be increased as desired. The invention is not confined in its application to the particular form of auxiliary speed changing devices shown and described. The arrangement of actuating means shown in the drawings could be changed in a multitude of ways which would involve mere mechanical ingenuity. It is not at all essential for the reversing actuating means (exemplified in the gear I) to be driven through the agency of the actuating means which drives the shaft in forward direction.

The above-suggested changes and many others which may appear to those skilled in the art, are to be construed as included within the proper scope of this invention as it is defined in the sub-joined claims.

Having described my invention, what I claim as new and desire to secure by Letters Patent of the United States is:—

1. A power-transmission mechanism having, in combination, a driven element; a driving element arranged to be connected with the driven element while one of said elements is in operation; and means independent of said elements for approximating the speed of operation of the engaging portions of said elements before the elements are connected.

2. A power-transmission mechanism having, in combination, a driving element; a driven element; means for connecting said elements for driving the latter; and means, under the control of the operator but actuated by the driving member, for causing said elements to assume, prior to said connection, a speed relation approximating that intended to exist after said connection has been made.

3. A power-transmission mechanism having, in combination, a driven element; a driving element arranged to be connected with the driven element; and means under the control of the operator but actuated by the driving member, for establishing a speed relation between the driving element and the driven element before they are connected.

4. A power-transmission mechanism having, in combination, a driving member; a driven member; a gear operatively connected with each of said members; means for causing the driving member to act through said gears to drive the driven member; and a device for causing said gears to assume approximately the same peripheral speed before the driving member becomes effective to drive the driven member.

5. A power-transmission mechanism having, in combination, a driving member; a driven member; a gear operatively connected with each of said members; means for causing the driving member to act through said gears to drive the driven member; and means which act frictionally to cause said gears to assume approximately the same peripheral speed before the driving member becomes effective to drive the driven member.

6. A power-transmission mechanism having, in combination, a driving shaft; a driven shaft; a gear rigid with one of said shafts; a gear on the other of said shafts arranged to be meshed with said rigid gear; and means for causing the shafts to assume the desired speed relation before the gears are meshed.

7. A power-transmission mechanism having, in combination, a driving shaft; a driven shaft; a gear rigid with one of said shafts; a sliding gear on the other of said shafts arranged to be meshed with said rigid gear; and means for causing the shafts to assume the desired speed relation before the gears are meshed.

8. A variable speed mechanism having, in combination, a driven member arranged to be driven at a plurality of different speeds; actuating means for driving the driven member at the different speeds; means for changing the speed of the driven member from one to a second speed; and means for causing the driven member and actuating means to assume approximately the speed relation appropriate to the second speed before the actuating means becomes effective to drive the driven member at said second speed.

9. A variable speed mechanism having, in combination, a driven member arranged to be driven at a plurality of different speeds; actuating means for driving the driven member at the different speeds; means for changing the speed of the driven member from one to a second speed; and means, under the control of the operator but actuated by the driving member, for causing the driven member and actuating means to assume approximately the speed relation appropriate to the second speed, before the actuating means becomes effective to drive the driven member at said second speed.

10. A variable speed mechanism having, in combination, a driven member; a driving element for driving the driven member at one speed; another driving element for driving the driven element at a different speed, both said driving elements being arranged for connection with and disconnection from said driven member; and means for causing one of said driving elements and the driven member to assume an appropriate speed relation before they are connected.

11. A variable speed mechanism having, in combination, a driven member; a driving element for driving the driven member at one speed; another driving element for driving the driven element at a different speed, both said driving elements being arranged for connection with and disconnection from said driven member; and means for causing one of said driving elements and the driven member to operate at approximately the same speed before they are connected.

12. A variable speed mechanism having, in combination, a driven member; a driving element for driving the driven member at one speed; another driving element for driving the driven member at a different speed, both said driving elements being arranged for connection with and disconnection from said driven member while said driven member is in operation; and means for causing one of said driving elements and the driven member to assume an appropriate speed relation before they are connected.

13. A variable speed mechanism having, in combination, a driven member; actuating means for positively driving said driven member at a plurality of different speeds; means for changing the speed of the driven member from one speed to a second speed; and means for causing the driven member and actuating means to assume approximately the speed relation appropriate to the second speed prior to the initiation of the positive drive by the actuating means at said second speed.

14. A variable speed mechanism having, in combination, a driven member arranged to be driven at a plurality of different speeds; actuating means for driving the driven member at the different speeds; means for changing the speed of the driven member from one speed to a second speed; and means put into operation by said speed changing means for causing the driven member and actuating means to assume approximately the speed relation appropriate to the second speed before the actuating means becomes effective to drive the driven member at said second speed.

15. A variable speed mechanism having, in combination, a driven member arranged to be driven at a plurality of different speeds; actuating means for driving the driven member at the different speeds; mechanism for changing the speed of said driven member from one speed to a second speed; and means which act frictionally to cause the driven member and actuating means to assume approximately the speed relation appropriate to the second speed before the actuating means becomes effective to drive the driven member at said second speed.

16. A variable speed mechanism having in combination, gears, a shaft adapted to be driven thereby at a plurality of different speeds; actuating means, including gears, for driving the shaft at the different speeds; means for changing the speed of the shaft from one to a second speed; and means which act frictionally to cause the shaft and actuating means to assume approximately the speed relation appropriate to the second speed before the actuating means becomes effective to drive the shaft at said second speed.

17. A variable speed mechanism having, in combination, a driven member arranged to be driven at a plurality of different speeds; actuating means for driving said driven member at said different speeds; means for changing the speed of said driven member from one to another of said plurality of speeds; and an auxiliary speed changing device corresponding to each of said plurality of speeds.

18. A variable speed mechanism having, in combination, a driven member arranged to be driven at a plurality of different speeds, including an intermediate speed; actuating means for driving the driven member at said different speeds; mechanism for changing the speed of the driven member from one speed to a second speed; and an auxiliary speed changing device which causes the actuating means and driven member to assume approximately the relation appropriate to intermediate speed when a change is being made from either relatively higher or relatively lower speed to the intermediate speed.

19. A variable speed mechanism having, in combination, a driven member arranged to be driven at a plurality of different speeds; actuating means for driving the driven member at said different speeds; mechanism for changing the speed of the driven member from one speed to a second speed; and an auxiliary speed changing device comprising a plurality of members which are normally out of contact with each other; and means for establishing communication between said members of the auxiliary speed changing device for throwing the latter into operation.

20. A variable speed mechanism having, in combination, a driven member arranged to be driven at a plurality of different speeds; actuating means for driving the driven member at said different speeds; means for interrupting communication between the actuating means and driven member when the latter is being driven at one speed, and for reëstablishing communication between the actuating means and driven member for driving at a second speed; and means which act, after the interruption and prior to the reëstablishment of said communication, to cause the actuating means and driven member to assume a new speed relation.

21. A variable speed mechanism having, in combination, a driven member arranged to be driven at a plurality of different speeds; actuating means for driving the driven member at said different speeds; mechanism for changing the speed of the driven member from one speed to another; and an auxiliary speed changing device which comprises a member operatively associated with the driven member, a member operatively associated with the actuating means, and means for establishing communication between said two members.

22. A variable speed mechanism having, in combination, a shaft; actuating means including a plurality of gears arranged respectively for driving said shaft at a plurality of different speeds; a plurality of gears associated with said shaft and arranged for engagement respectively with the gears of the actuating means; means for operatively connecting a gear of the actuating means and a gear associated with said shaft; and means for causing the actuating means and shaft to assume a new speed relation preliminarily to the operative connection of said gears.

23. A variable speed mechanism having, in combination, a shaft; actuating means including a plurality of gears arranged for driving said shaft at a plurality of different speeds; a plurality of gears associated with said shaft and arranged for engagement respectively with the gears of the actuating means; means for operatively connecting a gear of the actuating means and a gear associated with said shaft; and a device for each pair of connecting gears which acts independently of said gears to change the speed relation of the actuating means and shaft.

24. In a power transmission mechanism, a driving shaft, a driven shaft, a gear on each shaft arranged to be connected for driving the driven shaft, means for causing the gears before they are connected to assume a peripheral speed which shall be approximately, but not exactly, the same as the speed to be established by said connection.

25. In a power transmission mechanism, a driving shaft, a driven shaft, a plurality of gears on each shaft arranged to be connected for driving the driven shaft at different speeds, mechanism for causing a connection between a gear on one shaft and a gear on the other shaft, and means for causing a pair of gears about to be connected to assume a peripheral speed, before said connection, which shall be approximately, but not exactly, the same as the speed to be established by said connection.

26. In a power transmission mechanism, a driving element, a driven element, means for connecting said elements to drive the latter, and means independent of said elements for causing them to assume a definite speed relation which shall be approximately, but not exactly, the same as that to be established by said connection.

27. In a power transmission mechanism, a driving shaft, a driven shaft, a plurality of gears on each shaft, each of the gears on one shaft being arranged to be connected with a gear on the other shaft for driving the driven shaft at different speeds, and means for causing any pair of gears arranged for such connection to assume a peripheral speed, before said connection, which shall be approximately, but not exactly, the same as the speed to be established by said connection.

28. In a power transmission mechanism, a driving shaft, a driven shaft, gears on said shafts arranged to be connected, mechanism for effecting a connection between said gears, and means independent of said gears for causing them, before such connection, to rotate at a peripheral speed which shall be approximately, but not exactly, the same.

29. In a power transmission mechanism, a driving element, a driven element, means for operatively connecting said elements, and independent means operatively associated with each of said elements to establish a speed relation between said driving element and driven element approximating that intended to exist when said connection is made.

30. In a power transmission mechanism, a driving shaft, a driven shaft, a gear on each shaft arranged to be connected for driving the driven shaft, means for effecting a connection between said gears, mechanism, including a friction pulley on each shaft, arranged to drive said gears when disconnected at a peripheral speed which shall be approximately, but not exactly, the same, and means for operating said mechanism to establish said relative peripheral speed of the gears before they are connected.

31. A power transmission mechanism having, in combination, a driving shaft, a driven shaft, a plurality of gears operatively affixed to each of said shafts for driving one of said shafts at variable speeds relatively to the other, a pulley affixed to each shaft, said pulleys being in substantially the same plane, supplemental pulleys, a rocking carriage for said supplemental pulleys, and means for rocking said supplemental carriage whereby said supplemental pulleys will be peripherally engaged with said main pulleys.

32. In a variable speed mechanism, main variable speed members, an auxiliary speed changing device comprising the combination of main pulleys, supplementary pulleys, a rocking carriage for said supplementary pulleys, and a beveled block for rocking said carriage actuated by the main variable speed members.

33. A variable speed mechanism having, in combination, a driven member arranged to be driven at a plurality of different speeds; actuating means for driving the driven member at the different speeds; means for changing the speed of the driven member from one speed to a second speed; and means for causing the driven member to assume approximately said second speed before the actuating means becomes effective to drive the driven member at said second speed.

34. A variable speed mechanism having, in combination, a driven member; a driving member for positively driving said driven member at a plurality of different speeds; means for changing the speed of the driven member from one speed to a second speed; and means for causing said driven member to assume approximately said second speed prior to the initiation of the positive drive at said second speed.

35. A variable speed mechanism having, in combination, a driven member arranged to be driven at a plurality of different speeds; actuating means for driving the driven member at the different speeds; means for changing the speed of the driven member from one speed to a second speed; and means put into operation by said speed changing means for causing the driven member to assume approximately the second speed before the actuating means becomes effective to drive the driven member at said second speed.

36. A variable speed mechanism having, in combination, a driven member arranged to be driven at a plurality of different speeds; actuating means for driving the driven member at the different speeds; means for changing the speed of said driven member from one speed to a second speed; and means which act frictionally to cause the driven member to assume approximately the second speed before the actuating means becomes effective to drive the driven member at said second speed.

37. A variable speed mechanism having, in combination, a shaft arranged to be driven through gears at a plurality of different speeds; actuating means, including gears, for driving the shaft at the different speeds; and a device which acts frictionally to cause the shaft to assume approximately the second speed before the actuating means becomes effective to drive the shaft at said second speed.

38. A variable speed mechanism having, in combination, a driving shaft; a driven shaft; a plurality of gears on each of said shafts, each gear on one shaft being arranged for meshing with a corresponding gear on the other shaft, one pair of said corresponding gears being normally meshed; means for unmeshing said pair of gears and meshing another pair of gears; and means for changing the speed relation of the driving and driven shafts when the first pair of gears has been unmeshed and before the second pair has been meshed.

39. A variable speed mechanism having, in combination, a driving shaft; a driven shaft; a plurality of gears on said shafts, a gear on one shaft being normally meshed with a gear on the other shaft; means for unmeshing said gears; means for changing the speed relation of said shafts, after said gears have been unmeshed, independently of said plurality of gears; and means for causing some of said gears to drive the driven shaft in its new speed relation.

40. A power-transmission mechanism having, in combination, a driven member, actuating means arranged for driving said driven member; engaging means for causing the actuating means to drive the driven member; a device for causing the actuating means and driven member to assume, prior to the initiation of the drive of the driven member, approximately the speed relation intended to exist during said drive; and a controller for controlling the engaging means and said device.

41. A power-transmission mechanism having, in combination, two normally independent shafts having a common axis, one of said shafts being arranged for driving the other; means for causing one of said shafts to drive the other; a third shaft and means connected with the third shaft for causing said normally independent shafts to assume, prior to the initiation of the drive, approximately the speed relation intended to exist during the drive.

42. A reversing mechanism, having, in combination, a driven member; means for driving the driven member in one direction; actuating means for driving the driven member in a reverse direction; means for changing the direction of movement of the shaft from one direction to the reverse; and means for causing said actuating means and driven member to assume approximately the relation appropriate to reverse movement of the driven member before said actuating means becomes effective to drive the driven member in said reverse direction.

43. A reversing mechanism having, in combination, a driven member; a driving element for driving said driven member in one direction; another driving element for driving said driven member in a different direction, both said driving elements being arranged for connection with and disconnection from said driven member; and means for causing said driven member and one of said driving elements to assume the relation appropriate to the intended direction of movement of the driven member, before the driven member and said driving element are connected for driving the former in said intended direction.

44. A reversing mechanism having, in combination, a driven member; a driving element for driving said driven member in one direction; another driving element for driving said driven member in a different direction; means for changing the direction of movement of the driven member from one of said directions to the other; and means under the control of the operator but actuated by the driving member, for causing one of said driving elements and the driven member to assume their appropriate relation before said driving element becomes effective to drive said driven member.

45. A reversing mechanism having, in combination, a driven member arranged to be driven alternately in opposite directions; actuating means for driving the driven member in said directions respectively; mechanism for changing the direction of movement of the shaft from one direction to the reverse; and means for causing the shaft to assume motion in the reverse direction before the reverse drive commences.

46. A reversing mechanism having, in combination, a driven member arranged to be driven alternatively in opposite directions; actuating means for driving the driven member in said directions respectively; reversing mechanism for changing the direction of movement of the driven member from one direction to the reverse; and means put into operation by said reversing mechanism for causing said actuating means and driven member to assume approximately the relation appropriate to reverse movement of the driven member, before the actuating means becomes effective to drive the driven member in said reverse direction.

47. A reversing mechanism having, in combination, a driven member arranged to be driven alternatively in opposite directions; actuating means for driving the driven member in said directions respectively; mechanism for changing the direction of movement of the driven member from one direction to the reverse; and means which act frictionally to cause the actuating means and driven member to assume approximately the relation appropriate to reverse movement of the driven member before said actuating means becomes effective to drive the driven member in said reverse direction.

48. A reversing mechanism having, in combination, gears, a shaft adapted to be driven alternatively in opposite directions thereby; actuating means, including gears, for driving said shaft in opposite directions respectively; means for changing the direction of movement of the shaft; and means which act frictionally to cause the shaft to move in a reverse direction before the reverse drive commences.

49. A variable speed mechanism having, in combination, a driven member arranged to be driven at a plurality of different speeds and to be reversed; actuating means for driving the driven member at the different speeds and on the reverse; mechanism for changing the speed and direction of the driven member from one condition to a second condition, and means for causing the actuating means and driven member to assume approximately the relations of speed and direction appropriate to said second condition, before the actuating means becomes effective to drive the driven member at the speed and in the direction of said second condition.

In testimony whereof I have signed my name to this specification in the presence of two subscribing witnesses.

BENJAMIN F. MAYO.

Witnesses:
LAURENCE A. JANNEY,
ARTHUR L. RUSSELL.